United States Patent [19]

Angell et al.

[11] Patent Number: 4,832,782
[45] Date of Patent: May 23, 1989

[54] VACUUM RING FOR PRODUCING LAMINATED GLASS

[75] Inventors: Barbara L. Angell, Rossford; Charles E. Ash, Perrysburg; Scott W. Chambers, Millbury, all of Ohio

[73] Assignee: Libbey-Owens-Ford Co., Toledo, Ohio

[21] Appl. No.: 249,871

[22] Filed: Sep. 27, 1988

[51] Int. Cl.$^4$ .............................................. B32B 31/24
[52] U.S. Cl. ..................... 156/382; 156/87; 156/104; 156/285; 156/286
[58] Field of Search .................. 156/87, 382, 285, 286, 156/287, 104, 106; 269/21; 279/3; 425/405 R, 388, 389, DIG. 19, DIG. 60

[56] References Cited

U.S. PATENT DOCUMENTS

| | | | |
|---|---|---|---|
| 1,870,284 | 8/1952 | Draice | 156/104 |
| 2,948,645 | 8/1960 | Keim | 156/104 |
| 2,992,953 | 7/1961 | Talburtt | 156/104 |
| 3,074,466 | 1/1963 | Little | 156/104 |
| 3,074,838 | 1/1963 | Little | 156/104 |
| 3,281,296 | 10/1966 | Jameson | 156/104 |
| 3,808,077 | 4/1974 | Rieser | 156/104 |
| 3,933,552 | 1/1976 | Shumaker | 156/104 |
| 4,242,403 | 12/1980 | Mattimoe | 425/213 |
| 4,543,283 | 9/1985 | Curtze | 156/104 |
| 4,624,731 | 11/1986 | Ash | 156/382 |
| 4,647,327 | 3/1987 | Rase | 156/87 |
| 4,781,783 | 11/1988 | Ash | 156/382 |

Primary Examiner—Merrell C. Cashion, Jr.
Attorney, Agent, or Firm—Marshall & Melhorn

[57] ABSTRACT

A vacuum ring is coupled to a vacuum source and utilized to de-air a laminated, electrically heated glass assembly having a cut-out portion adjacent the peripheral marginal edge of the laminae while the assembly is positioned within a pressurized and heated autoclave unit. The vacuum ring has a channel for receiving the edge of the glass assembly and the walls of the channel each have a single longitudinally extending groove approximately intermediate the edges of the wall. At least one of the walls is provided with a lip like extension disposed to cover the cut-out portion of the one of the laminae. The grooves interconnect with a vacuum source. The channel generally conforms to the outer edge of the glass assembly with or without applied vacuum or pressure, and the provision of grooved walls tends to enhance the sealing of the ring to the glass.

1 Claim, 1 Drawing Sheet

VACUUM RING FOR PRODUCING LAMINATED GLASS

BACKGROUND OF THE INVENTION

The present invention relates generally to a vacuum system for evacuating the space between at least two laminae of a laminated assembly and in particular to a vacuum ring construction which is utilized for de-airing a laminated glass assembly such as an electrically heated windshield for use in vehicles such as automobiles, for example. The present invention is an improvement over the invention disclosed in U.S. Pat. No. 4,624,731, dated Nov. 25, 1986.

In the early stages of the automobile industry, single sheets of ordinary glass were employed as windshields. As it became evident that this type of windshield presented a considerable safety hazard, the single sheets of ordinary glass were replaced with single sheets of heat treated or tempered glass. Thereafter, laminated safety glass was developed to further reduce the severity of lacerative injuries. The use of laminated glass assemblies greatly increased, until today, when almost all automotive windshields are constructed of some type of laminated glass.

Typically, a laminated glass assembly of the type utilized in vehicle windshields consists of two sheets of glass bonded together with a thin plastic interlayer, such as a sheet of polyvinyl butyral, or the like. In the event of an impact on the laminated glass sufficient to break it, the plastic interlayers function to bind the glass fragments together, thus reducing the risk of injury to a driver or passenger as a result of flying glass or contact with the windshield.

Recently, it has been found that the addition of a second plastic layer to the inner surface of the windshield further reduces the risk of injury. This second plastic layer has been called an anti-laceration shield. Also, it has been found that a single sheet of glass having an anti-lacerative plastic layer applied to its inner surface can serve as a safety windshield or other type of safety window. A detailed discussion of laminated windshield assemblies and their production methods can be found in U.S. Pat. Nos. 3,808,077 and 4,242,403, both of which are hereby incorporated by reference.

Present developments have enable laminated windshield assemblies to be coupled to a source electrical energy to effectively supply heat energy to the assembly to melt ice formed on the extended surface thereof and assist in militating against the formation of ice or snow thereon.

One of the problems of manufacturing laminated glass assemblies of this type is related to the assembling and bonding techniques used to produce a windshield having high optical qualities, characterized by the lack of defects sometimes called "blow-ins". Once the individual laminae of the laminated assembly have been assembled in a stacked arrangement, the individual laminae are pressed toward one another while the entire assembly is heated to a predetermined temperature to cause the layers of plastic material to soften and bond to the adjacent glass sheets. This is typically done in an autoclave. The autoclave chamber is sealed, heated and pressurized, which causes the desired bonding to occur.

Prior to placing the stacked arrangement of individual laminae in an autoclave, it has been found desirable to "de-air" the assembly by evacuating air spaces which may be present between the individual laminae. One method is to place the assembly in a plastic bag and evacuate the bag. A more current method is to use a vacuum ring of the type disclosed in U.S. Pat. Nos. 2,948,645 and 3,074,466. These patents disclose a flexible vacuum ring which is provided with a channel for receiving the entire peripheral edge of the assembly. The channel of the vacuum ring includes a recessed portion which is maintained in a spaced-apart relationship with the entire peripheral edge of the glass assembly, to define a vacuum passage.

In some instances, it is desirable to maintain the vacuum ring in place when the assembly is within the autoclave, and to apply a vacuum to the ring during at least part of the time the assembly is heated and pressurized. However, one of the problems with that approach is that the marginal edges of the glass sheets and into the recessed portion of the vacuum ring. This tends to reduce the thickness of the plastic layers around the marginal edges of the glass, and produce undesirable optical distortion in those areas.

Another problem exists with electrically heated laminated windshield assemblies. Such assemblies are formed such that one of the plys of the laminate is provided with a cut-out area formed by the removal of a portion of the marginal edge thereof. It has been found that this cut-out portion has rendered the existing vacuum ring structures incapable of providing or achieving the necessary sealing relation with the assembly to maintain the desired vacuum.

It will be appreciated that the cut-out portion is required in the laminated assembly to accommodate the electrical connections necessary to couple the assembly to a source of electrical energy.

SUMMARY OF THE INVENTION

The present invention relates to a unique vacuum ring construction which provides the desired seal about the peripheral edges of the electrically heated laminated assembly during the heating and pressurizing operation in the autoclave.

The vacuum ring of the present invention is adapted to be coupled to a vacuum source and to be mounted about the peripheral edge of the laminated assembly. The ring is constructed of a flexible material, such as by an extrusion or molding of a rubber material, with a vacuum tee molded to and bridging its free ends. The ring is provided with a channel formed therein for receiving the peripheral edge of the laminated assembly.

In accordance with the present invention, the channel defines an inner surface having a cross-sectional configuration defined by the shape of the outer edge surface of the laminated assembly before the ring is mounted on the laminated assembly and coupled to the vacuum source. This inner surface is defined by first and second facing wall sections, and an interconnecting floor portion. Each facing wall portion includes a longitudinally extending continuous single groove formed therein; the grooves being distal to both the outer edge of the wall and to the floor portion, and being formed in facing intermediate portions of the first and second walls. Also, the floor portion includes a longitudinally extending continuous single groove having a width substantially coextensive with the thickness of an edge of an intermediate one of the laminae. The floor portion groove is disposed adjacent this edge when the ring is mounted on the laminated assembly to be bonded. The two grooves in the walls and the single groove in the floor portion are connected to the source of vacuum.

The inner peripheral edge of one of the facing walls is provided with an integral extended lip portion positioned to extend over the cut-out portion of the one of the plys of the laminate.

In the preferred embodiment of the invention, the extend lip is formed with gentle transition configuration toward and away from the main body of the ring.

The above, as well as other objects and advantages of the present invention, will become readily apparent to one skilled in the art from reading the following detailed description of the invention in conjunction with the attached drawings.

DESCRIPTION OF THE PREFERRED EMBODIMENT

It should be noted at the outset of this description that, while the vacuum ring of the present invention is described for use in connection with producing a particular laminated glass assembly, it will be appreciate that the vacuum ring can be utilized in the manufacturing of other types of laminated assemblies, including multiple layers of non-glass materials wherein one of the plys is provided with a cut-out portion at a marginal edge thereof.

Figure 1:
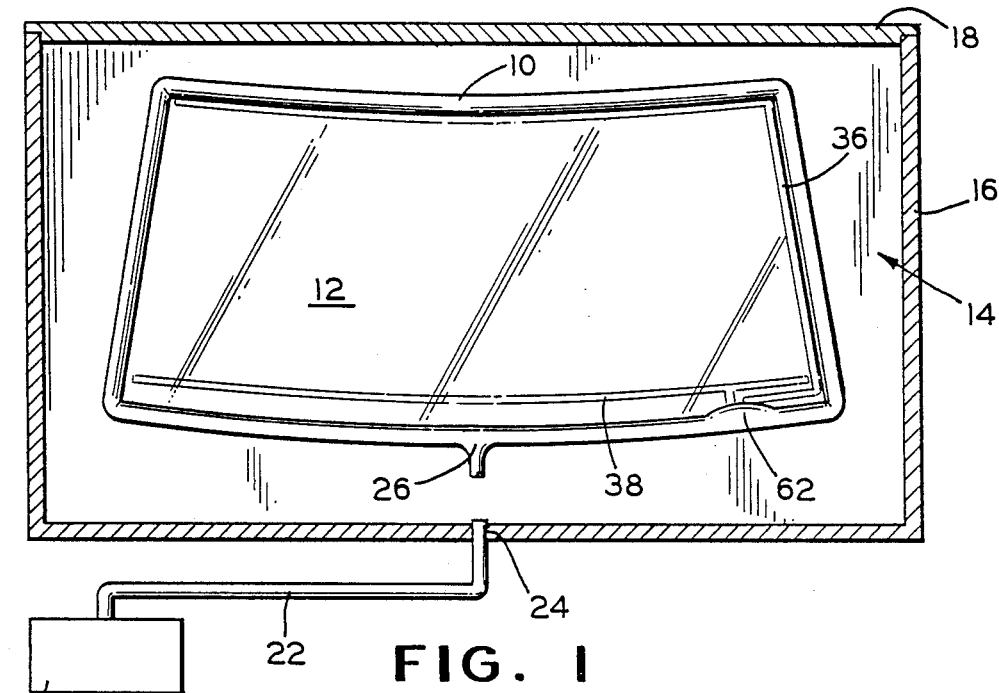
FIG. 1 is a schematic view of a laminated glass assembly having a vacuum ring of the present invention mounted about the peripheral edge of the glass assembly, with the assembly located in an autoclave chamber, and connected to a vacuum source.

Turning first to FIG. 1, there is shown a schematic view of a vacuum ring 10 positioned around the peripheral edge of a laminated glass assembly 12. The individual laminae of the laminated assembly 12 of FIG. 1 are shown in more detail in FIGS. 2 and 3. The laminated glass assembly 12 and the vacuum ring 10 are shown placed in an autoclave chamber 14, defined by an autoclave wall 16 and a removable top panel 18.

The vacuum ring 10 is shown connected to a vacuum source 20, through a line 22 which enters the chamber 14 through an appropriate sealed aperture 24, and is connected to the ring 10 at a vacuum tee portion 26.

It will be apparent that, in practice, the chamber 14 is large enough to accommodate a large number of the laminated glass assemblies 12 and the vacuum rings 10, and includes appropriate support means, not shown, for the assemblies, and an appropriate vacuum distribution network, now shown. Also, the autoclave is preferably a steam autoclave, and is operated to produce a pressure of sixteen to seventeen atmospheres, while the pressure within the vacuum ring 10 is near zero atmospheres, for a pressure differential of seventeen to eighteen atmospheres. This may make apparent the derivation of the term "blow-ins" for visual defects caused by poor sealing of a vacuum ring.

Figure 2:
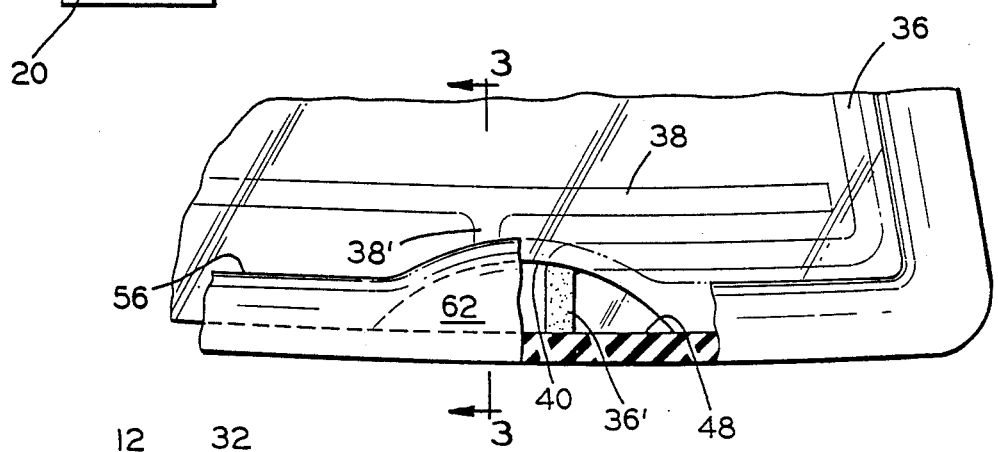
FIG. 2 is an enlarged fragmentary view with portions cut-away of the apparatus illustrated in FIG. 1, showing the vacuum ring of the invention and an assembly of a laminated shield layer and a removable cover glass sheet.
Figure 3:
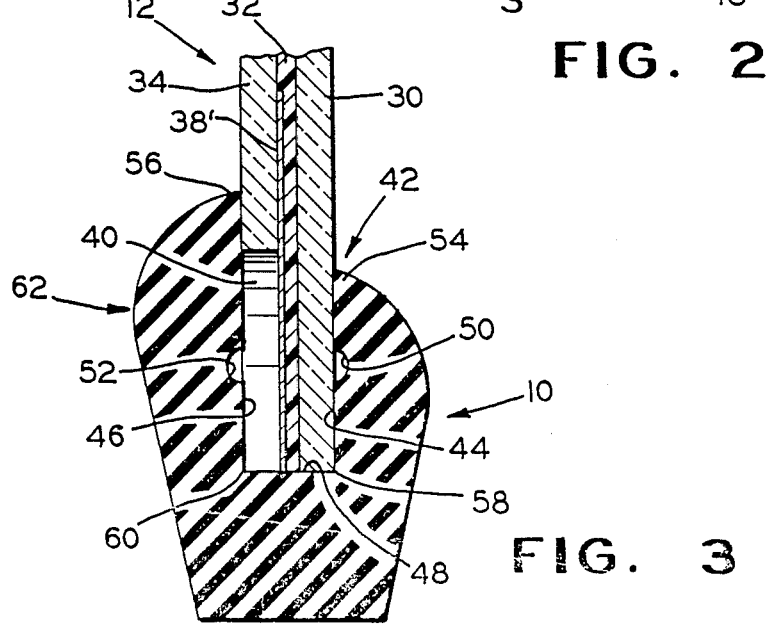
FIG. 3 is an enlarged sectional view taken along line 3—3 in FIG. 1, showing the assembly of FIG. 2 as it appears at the electrical connection portion of the assembly.

Turning now to FIGS. 2 and 3, it will be noted the illustration laminated glass assembly 12 is basically comprised of an outer glass sheet 30, a laminating plastic sheet 32, and an inner glass sheet 34.

The assembly further includes an upper electrically conductive bus bar 36 and a lower electrically conductive bus bar 38. The upper bus bar 36 is typically formed to extend generally along the upper marginal edge, the side edge, a portion of the lower edge of the assembly 12, and terminates at an electrical connector section 36'. The lower bus bars 38 is typically formed to extend generally along the lower marginal edge of the assembly 12 and terminates at an electrical connector section 38'. The electrical connector sections 36' and 38' are closely spaced from one another and must be readily available and exposed to enable electrical connection with a power source in the vehicle into which the assembly 12 is to be mounted. Therefore, the inner glass sheet 34 is formed with a cut-out section 40 thereby exposing the electrical connector sections 36' and 38'.

The laminating plastic sheet 32 is employed to bond the facing surfaces of the outer glass sheet 30 and the inner glass sheet 34.

The vacuum ring 10 includes a channel 42 defined by a first wall portion 48. The wall portions 44 and 46 each includes a longitudinally extending continuous groove 50 and 52 respectively, each of which is distal from respective outer edges 54 and 56 of the wall portions 44 and 46, and from respective intersections 58 and 60 of the wall portions 44 and 46 and the floor portion 48. It will be noted that the outer edge 56 of the wall portion 46 is formed to extend upwardly from the floor portion 48 to produce an upwardly extending lip portion 62 in the region of the cut-out section 40 of the inner glass sheet 34 to completely envelop the same. It should be noted that the grooves 50 and 52, the channel 42 tightly conforms to the outer peripheral edges of the both sides of surfaces of laminated glass assembly 12.

In operation, it will be appreciated that the grooves 50 and 52 are connected to a vacuum source 20 through the vacuum tee 26 and the associated line 22. Typically, in use the wall portion 46 and associated groove 52 are caused to be formed as illustrated in FIG. 3.

Thus, the invention provides a vacuum ring for evacuating the air spaces between laminae of a laminated assembly of the type in which there is at least one cut-out section of one of the plys of the assembly, which effectively improves sealing to the laminae, whether of glass or other materials.

In accordance with the provisions of the patent statutes, the present invention has been described n what is considered to represent its preferred embodiment. However, it should be noted that the invention can be practiced otherwise than as specifically illustrated and described without departing from its spirit or scope.

What is claimed is:

1. A vacuum ring for use in removing air spaces between the facing surfaces of at least two laminae of a laminated assembly, wherein at least one of the laminae has a cut-out portion extending inwardly from the peripheral edge thereof, the ring is adapted to be coupled to a vacuum source and to be mounted about the entire peripheral edge of the laminated assembly, and is formed of a flexible material having a channel formed therein for receiving the peripheral edge of the laminated assembly, said channel is defined by an inner surface having a cross-sectional configuration which generally conforms to the cross-sectional configuration of the outer edge surface of the laminated assembly, said inner surface including first and second facing wall portions and an interconnecting floor portion, the major length of the first and second facing wall portions extending away from said floor portion less than the inward extension of the cut-out portion of the one of the laminae, at least one of said wall portions including a section extending from said floor portion sufficiently to cover the cut-out portion of the one of the laminae, each said facing wall portion having a longitudinally extending continuous groove formed therein, each said groove being spaced between an outer edge and an intersection of said wall portion of said floor portion, and said grooves in said first and second wall portions being coupled to a source of vacuum when the ring is mounted on a laminated assembly and coupled to a vacuum source.

* * * * *